US007627089B2

(12) United States Patent
Rantanen

(10) Patent No.: US 7,627,089 B2
(45) Date of Patent: Dec. 1, 2009

(54) METHOD FOR PRODUCING A COLLIMATOR

(75) Inventor: Juha Rantanen, Solna (SE)

(73) Assignee: XCounter AB, Danderyd (SE)

( * ) Notice: Subject to any disclaimer, the term of this patent is extended or adjusted under 35 U.S.C. 154(b) by 770 days.

(21) Appl. No.: 11/403,966

(22) Filed: Apr. 14, 2006

(65) Prior Publication Data

US 2007/0228155 A1 Oct. 4, 2007

(30) Foreign Application Priority Data

Mar. 28, 2006 (SE) .................................... 0600694

(51) Int. Cl.
*G01K 1/02* (2006.01)

(52) U.S. Cl. ....................................... 378/149; 378/147

(58) Field of Classification Search ................. 378/145, 378/147, 149, 154, 35
See application file for complete search history.

(56) References Cited

U.S. PATENT DOCUMENTS 5,581,592 A * 12/1996 Zarnoch et al. ............. 378/154
6,556,657 B1 4/2003 Tybinkowski et al.
2002/0064252 A1 5/2002 Igarashi et al.
2005/0111627 A1 5/2005 Leppert
2005/0243422 A1 11/2005 Distler et al.

OTHER PUBLICATIONS

International Type Search Report for corresponding Swedish Application No. 0600694-4 dated Sep. 19, 2006.

* cited by examiner

*Primary Examiner*—Hoon Song
(74) *Attorney, Agent, or Firm*—Harness, Dickey & Pierce, P.L.C.

(57) ABSTRACT

The invention is related to a method for producing a collimator comprising an X-ray transparent substrate. The innovative method comprises the steps of: forming a slit in the substrate, wherein the slit has first and second side walls; filling the slit with an X-ray absorbing material so that the absorbing material extends from the first side wall to the second side wall; removing part of the X-ray absorbing material thereby forming a second slit that extends from the remaining absorbing material to the second side wall; filling the second slit with X-ray transparent material; removing part of the X-ray transparent material, thereby forming a third slit extending from the remaining transparent material to the second side wall; and finally filling the third slit with X-ray absorbing material. In accordance with the present invention a collimator can be produced having any desired aspect ratio.

17 Claims, 6 Drawing Sheets

METHOD FOR PRODUCING A COLLIMATOR

FIELD OF THE INVENTION

The present invention relates to the field of x-ray detectors, and in particular to an improved method for producing a collimator as defined in the preamble of claim 1.

BACKGROUND OF THE INVENTION

Medical imaging is important for enabling early diagnosing of many diseases and X-ray detectors are widely used for this end. X-radiation is absorbed at different rates in different tissue types such as bone, muscle and fat, forming an image that can be examined by a physician in diagnosing purposes. The importance of obtaining as accurate images as possible is readily understood. Further, X-radiation may be harmful in larger doses and it is therefore important to minimize the X-ray dose that a patient is exposed to during an examination.

In view of accuracy of the images, a collimator or diaphragm or aperture constitutes an important part of an x-ray apparatus. A collimator is a device including a material that significantly absorbs X-radiation and that serves to gate or collimate beams as well as to shield from scattered radiation. It is designed to filter a stream of rays so that only those entering the openings of the collimator in a certain direction are allowed through and all other rays are absorbed. Without a collimator rays from all directions would illuminate the patient giving unnecessary high radiation dose. Using a collimator thus ensures that only useful X-rays are irradiating the patient, hence reducing the radiation dose. Furthermore, the collimator can be used to produce narrow sheets or beams of X-rays improving the position resolution of some type of X-ray detectors where the width of the incoming X-ray beam defines the position resolution rather than the pixel size of the X-ray detector.

Typically, a collimator is a thick sheet of some radiation-absorbing material, such as lead, with one or several thin slits machined or etched through it. There are several considerations to pay attention to when making a collimator in order to obtain a high quality image and minimize the radiation dose that the patient is subjected to. In order to absorb X-rays efficiently, the sheet from which the collimator is made cannot be too thin, although it would be favourable in view of consumption of material and related costs, and also since a lighter collimator would be easier to handle. A difficulty when making a collimator is undercut, i.e. the lateral etching that occurs as the etching proceeds vertically. The thicker the material the more pronounced is the undercut problem, i.e. it is difficult to increase the thickness of the sheet and maintain a small and uniform slit. The ratio of the thickness of the sheet to the width of a slit is known as the aspect ratio. However, a thinner sheet entails other difficulties in the production of the collimator, since a thin material is more prone to warping and obtaining altered dimensions than a thicker one, which affect the precision of the collimator. Further, a too thin collimator is not feasible since undesired radiation would penetrate the collimator resulting in a deteriorated image quality and also in the patient being subjected to a higher radiation dose.

A collimator should pass substantially parallel radiation originating unscattered from the X-ray source and absorb non-parallel radiation that e.g. has scattered between the X-ray source and the collimator. To meet the second requirement, the sheet should be of adequate thickness for absorbing the non-parallel radiation.

Further, the manufacturing of a collimator is a work requiring high accuracy and precision, comprising forming slits of dimensions down to a μm range, and it is difficult to obtain an adequate accuracy. Such precision work is additionally very costly and requires expensive tooling, which adds considerably to the cost of an X-ray apparatus.

A collimator can be manufactured in a vertical or horizontal lamellar structure, i.e. a number or thin layers are prepared individually, each having the desired pattern. Thereby the difficulties related to undercut is avoided. However, the precision may still be inadequate since it is very difficult to stack the different layers on top of each other with maintained precision.

All the above-mentioned factors and difficulties related to the manufacturing of collimators ultimately affect the performance of the X-ray apparatus and an improved method of making a collimator would therefore be desirable.

SUMMARY OF THE INVENTION

It is an object of the present invention to provide an improved method of producing a collimator, and in particular a more flexible method yielding a collimator with adequate accuracy and eliminating the need for tedious steps such as stacking layers or steps leading to decreased precision, for example due to undercut, thereby alleviating the shortcomings of the prior art.

A further object is to provide an improved method enabling the customizing of a collimator in dependence on the requirements put on it, and in particular to provide a method with high precision by means of which the accuracy of the collimator can be maintained for any desired thickness of the collimator.

A further yet object is to provide a cost-efficient method for producing a collimator resulting in a inexpensive collimator, and thus lowering the costs of the X-ray apparatus.

These objects, among others, are achieved by a method for producing a collimator as defined in the characterizing part of claim 1.

In accordance with the invention a method for producing a collimator comprising an X-ray transparent substrate is provided. The innovative method comprises the steps of: forming a slit in the substrate, wherein the slit has first and second side walls; filling the slit with an X-ray absorbing material so that the absorbing material extends from the first side wall to the second side wall; removing part of the X-ray absorbing material thereby forming a second slit that extends from the remaining absorbing material to the second side wall; filling the second slit with X-ray transparent material; removing part of the X-ray transparent material, thereby forming a third slit extending from the remaining transparent material to the second side wall; and finally filling the third slit with X-ray absorbing material. In accordance with the present invention a collimator can be produced having any desired aspect ratio. By means of the inventive method, no lamination is needed, thus eliminating the precision errors related to the alignment of different layers. Further, by means of the invention, the collimator can be made in an efficient and cost-effective way, yielding an inexpensive collimator.

In accordance with an embodiment of the invention, the step of removing part of the X-ray absorbing material comprises the sub-steps of: removing in depth a part of the X-ray absorbing material by means of a cutting tool; moving the cutting tool laterally; and removing in depth another part of the X-ray absorbing material by means of the cutting tool. By accomplishing the removal of the material in several small removal steps, problems related to undercut is avoided, and a collimator having a high performance can thereby be provided. In accordance with an embodiment of the invention these steps are repeated until a desired slit depth is obtained.

The above-mentioned removal steps can be performed also for the removal of the X-ray transparent material, whereby the same advantages are obtained. Further, in accordance with an embodiment of these sub-steps, the cutting tool is moved laterally in the range of 1-1000 μm. The depth of the cut made in each cutting step can for example be in the range of 1-1000 μm. A high precision of the slits can thereby be provided, the sidewalls of the slit having a very low $R_a$-value.

In accordance with yet another embodiment, the formed slits have a slanted surface, whereby an angled slit is formed. The slit, i.e. the X-ray transparent part, can have a width between 1 μm and 1 cm, preferably 1-1000 μm and most preferably 10-100 μm, while the thickness of the substrate can be chosen to be in any range. A collimator of any desired aspect ratio can thereby be provided.

In accordance with another embodiment of the invention, any X-ray transparent material can be utilized, for example carbon or plastic or any other materials or mixtures of materials with low atomic numbers. Likewise, any suitable X-ray absorbing material can be utilized, for example wolfram, lead, gold, copper or any other material or mixtures of materials with high atomic numbers. A most flexible method is thereby provided, enabling the use of frequently used and readily available materials, and also enabling the use of a material suitable for a specific application without having to alter the production method.

In accordance with yet another embodiment of the invention, several slits are formed, each slit having a desired slope. The slits can have different slopes, that is, the collimator can have slits of varying slopes enabling the customizing of the collimator to any desired application.

Further characteristics of the invention and advantages thereof, will be evident from the following detailed description of preferred embodiments and the accompanying FIGS. 1-5, which are given by way of illustration only, and are not to be construed as limitative of the present invention.

DETAILED DESCRIPTION OF PREFERRED EMBODIMENTS

FIGS. 1*a*-1*f* illustrate the steps of an embodiment of the method for producing a collimator 1. A substrate 2 of carbon fibre, plastic or any suitable X-ray transparent material is the starting point for the production of a collimator 1 in accordance with the invention. The substrate should have sufficient rigidity to enable an easy handling of it and can have any desired dimensions, for example 50×50 cm or larger, e.g. 1×1 m or smaller, e.g. 10×10 cm.

Figure 1A:
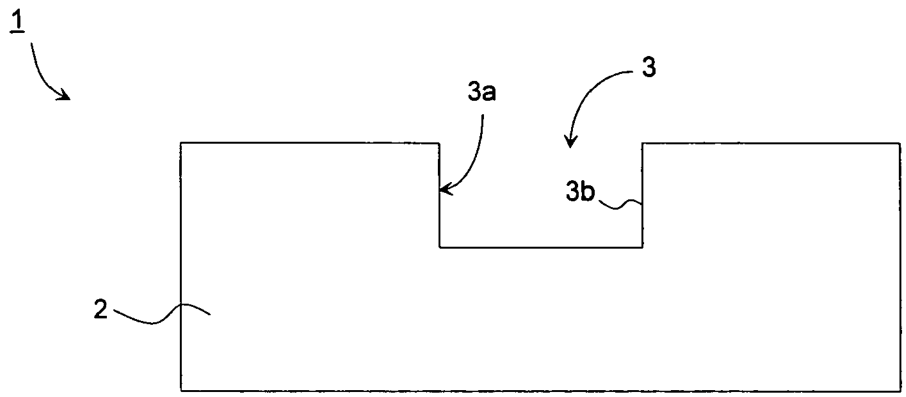
FIGS. 1*a*-1*f* illustrate different steps involved in the method in accordance with an embodiment of the invention.

In a first step, illustrated in FIG. 1*a*, a first slit 3 is formed having side walls 3*a* and 3*b*, for example by means of etching, cutting, turning or grinding. The first slit 3 can have any desired width; a typical width suitable for medical X-ray applications such as mammography is or general X-ray imaging of the body is 1-10 000 μm, preferably 10-500 μm.

Figure 1B:
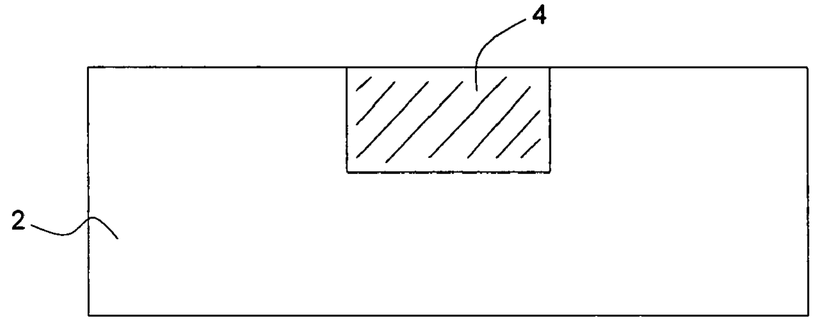

Next, as shown in FIG. 1*b*, the first slit 3 is filled with a material 4 absorbing X-rays of the desired energy. For example, in a medical X-ray applications Wolfram (W), lead (Pb), gold (Au), copper (Cu) or any other material or mixture of materials with high atomic numbers are suitable material, however it is understood that any material or alloy absorbing X-rays could be used. The filling material used can also be a mixture of an absorbing material in the form of powder or grains mixed with a binding material, e.g. glue or plastic. The depth of the first slit 3 can be made to comply with the requirements of an intended application. For example, if the collimator 1 is to be used in medical X-ray applications there are certain requirements regarding the dose of X-radiation that the patient is allowed to be exposed to, and the depth of the first slit 3 should be made in such a way that sufficient absorption of the X-rays is accomplished. The thickness of the required X-ray absorption material increases with the desired energy of the X-ray beam.

Figure 1C:
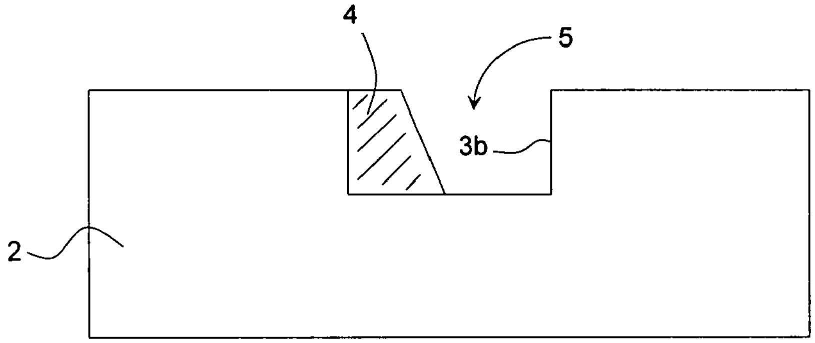

Thereafter, as illustrated in FIG. 1*c*, part of the X-ray absorbing material 4 is cut away, resulting in a new slit 5. The cutting is preferably made in such a way as to leave a slanted surface of the X-ray absorbing material 4, resulting ultimately in a collimator having angled slits. There are advantages in providing a collimator having angled slits, for example when using direction sensitive detectors or for X-ray sources emitting X-rays in a cone beam geometry as in most medical and industrial and security X-ray applications where X-rays are emitted from a small point-like source.

Figure 1D:
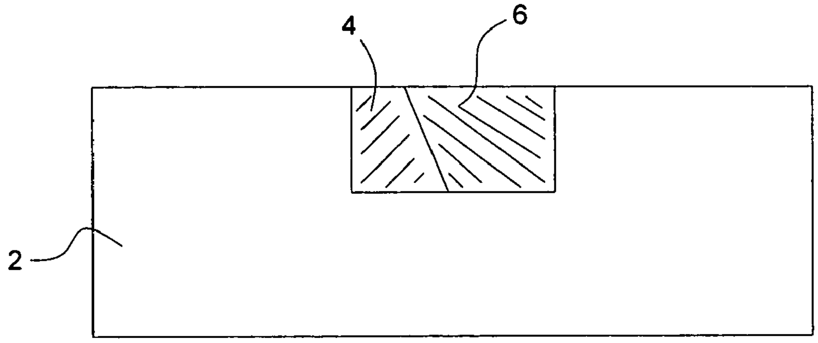

Next, as seen in FIG. 1*d*, the slit 5 is filled with an X-ray transparent material 6, for example carbon (C), epoxy glue or plastic or any other material of low atomic numbers. Any suitable material transparent to X-rays of the desired energy can be used, and the lower the atom number of the material the more transparent it is to X-rays of given energy.

Figure 1E:
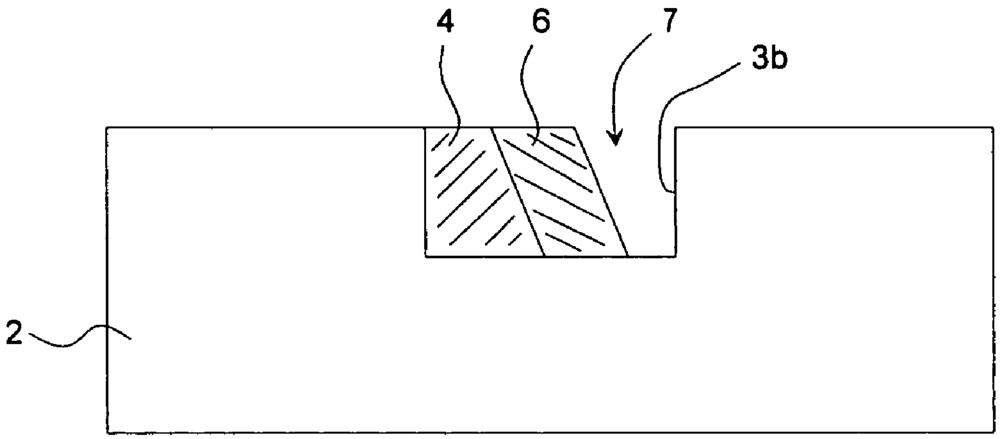

The following step, shown in FIG. 1*e*, comprises cutting away part of the filling made in the previous step, that is, in this case cutting away part of the X-ray transparent material 4, which results in a slit 7. Again, the remaining material 6 is preferably made leaving a slanted surface.

Figure 1F:
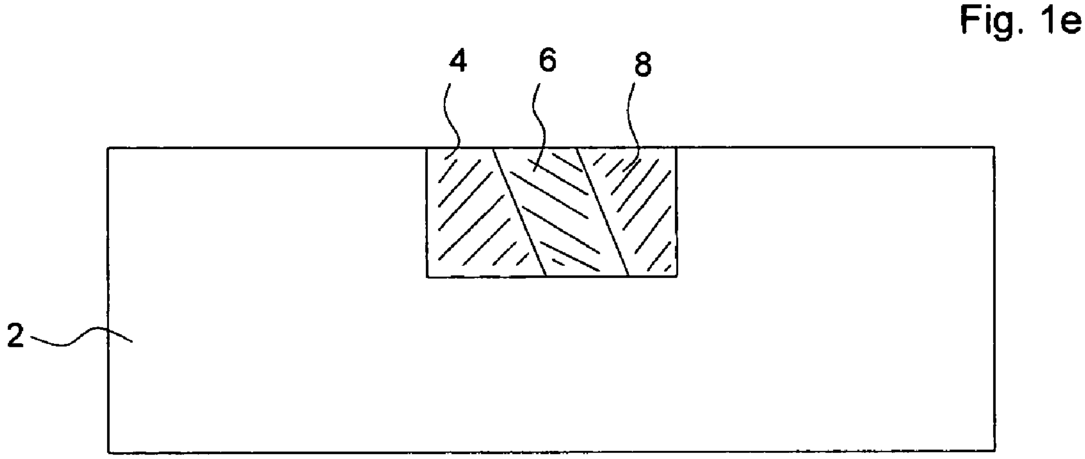

Next, with reference to FIG. 1*f*, the slit 7 is filled with an X-ray absorbing material 8, preferably the same material as used in the step described with reference to FIG. 1*c*.

The description thus far of the inventive method has been simplified and only shows the general idea. As was explained in the introductory part of the description, it is difficult to maintain the precision of the collimator as it is made thicker due to a lateral etching occurring when etching vertically. This is known as undercut. In order to avoid such problems with undercut and thus overcoming the prior art difficulties, the removal of the material in the step shown in FIG. 1*b* is performed in several small removal steps, and the result shown in FIG. 1*c* is thus simplified. Therefore, backing a few steps: the removal of the X-ray absorbing material described in relation to FIGS. 1*b* and 1*c* will now be described more in detail with reference to FIGS. 2*a*-2*d*.

Figure 2A:
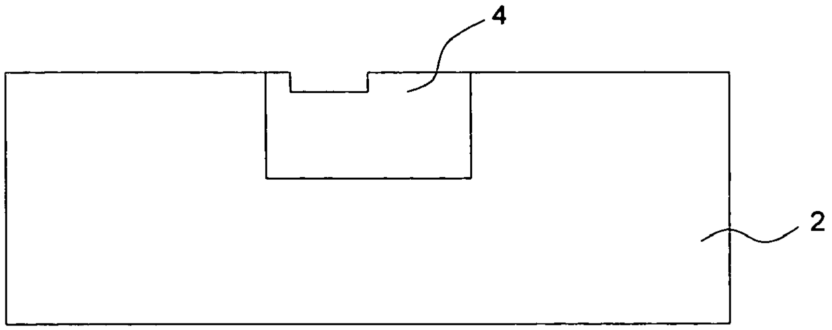
FIGS. 2*a*-2*d* illustrate sub-steps of the step shown in FIGS. 1*b*-1*c*.

FIGS. 2*a*-2*d* illustrate schematically the step of removing the X-ray absorbing material 4 and thus forming a slit. In FIG. 2*a* a first removal sub-step is illustrated, the substrate 2 having a slit formed therein filled with X-ray absorbing material 4. As is indicated in the figure, the removal in depth is made in rather small steps, resulting in that only a small part of the material to be removed is removed in depth in each step. The placement of the aperture within the X-ray absorbing material 4 can be made as is best suited for a particular application.

Figure 2B:
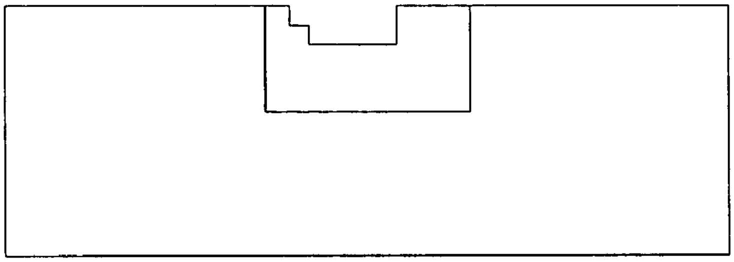
Figure 2C:
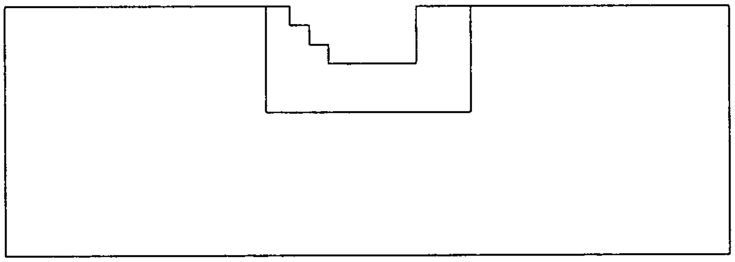
Figure 2D:
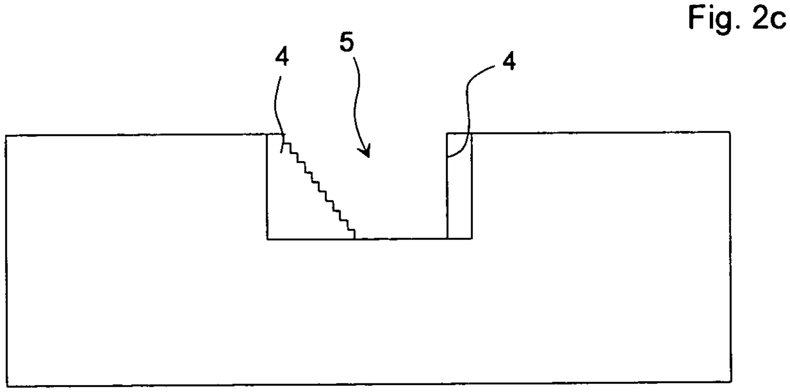
Figure 3A:
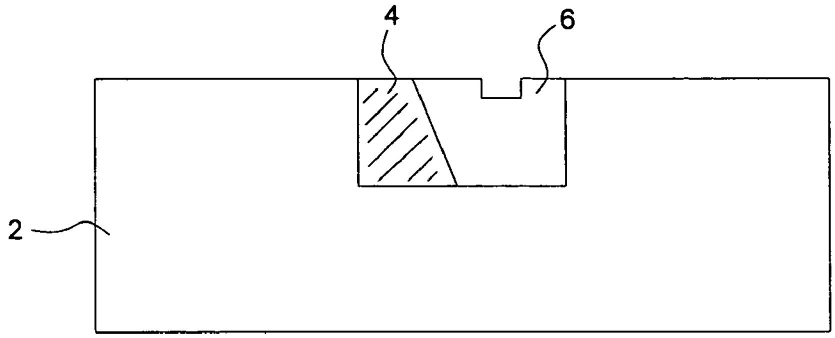
FIGS. 3*a*-3*d* illustrate sub-steps of the step shown in FIGS. 1*d*-1*e*.
Figure 3B:
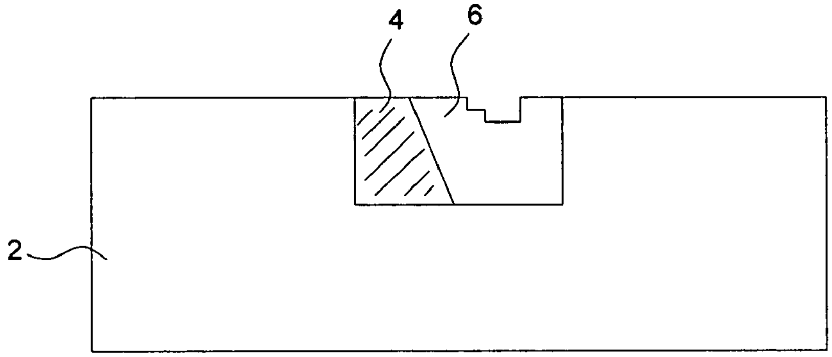
Figure 3C:
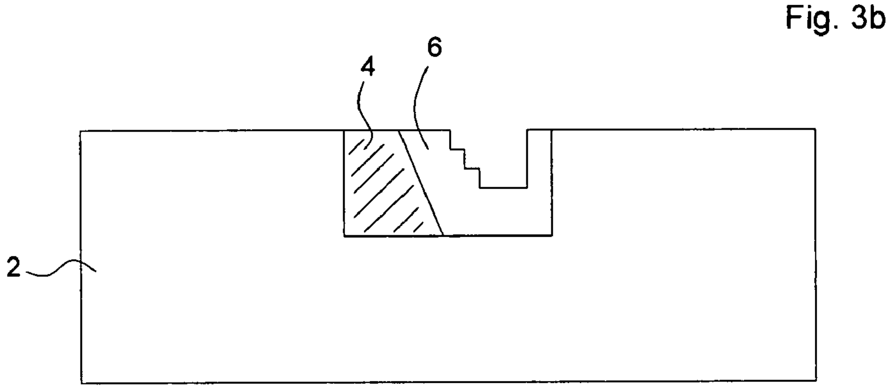
Figure 3D:
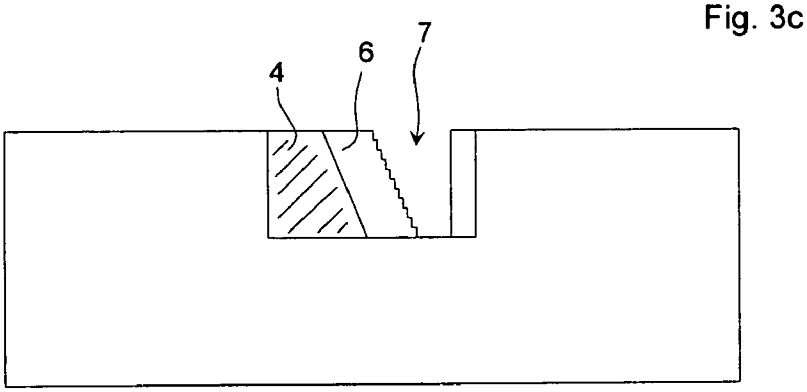

Next, as shown in FIG. 2*b* the cutting tool is moved laterally in order to cut away more of the X-ray absorbing material 4. These removal steps are repeated, as illustrated in FIGS. 2*c* and 2*d*, until the desired aperture depth is obtained. As is realised, the lateral movement of the cutting tool used cannot be made indefinitely small and the surface smoothness is dependent upon the size of the movements. The depth of each cutting step is preferably made such that no lateral cutting occurs.

FIGS. 3*a*-3*d* illustrate schematically and in a corresponding way as described above in connection to FIGS. 2*a*-2*d*, the step of removing the X-ray transparent material 6 and thus finalising the aperture.

Figure 4:
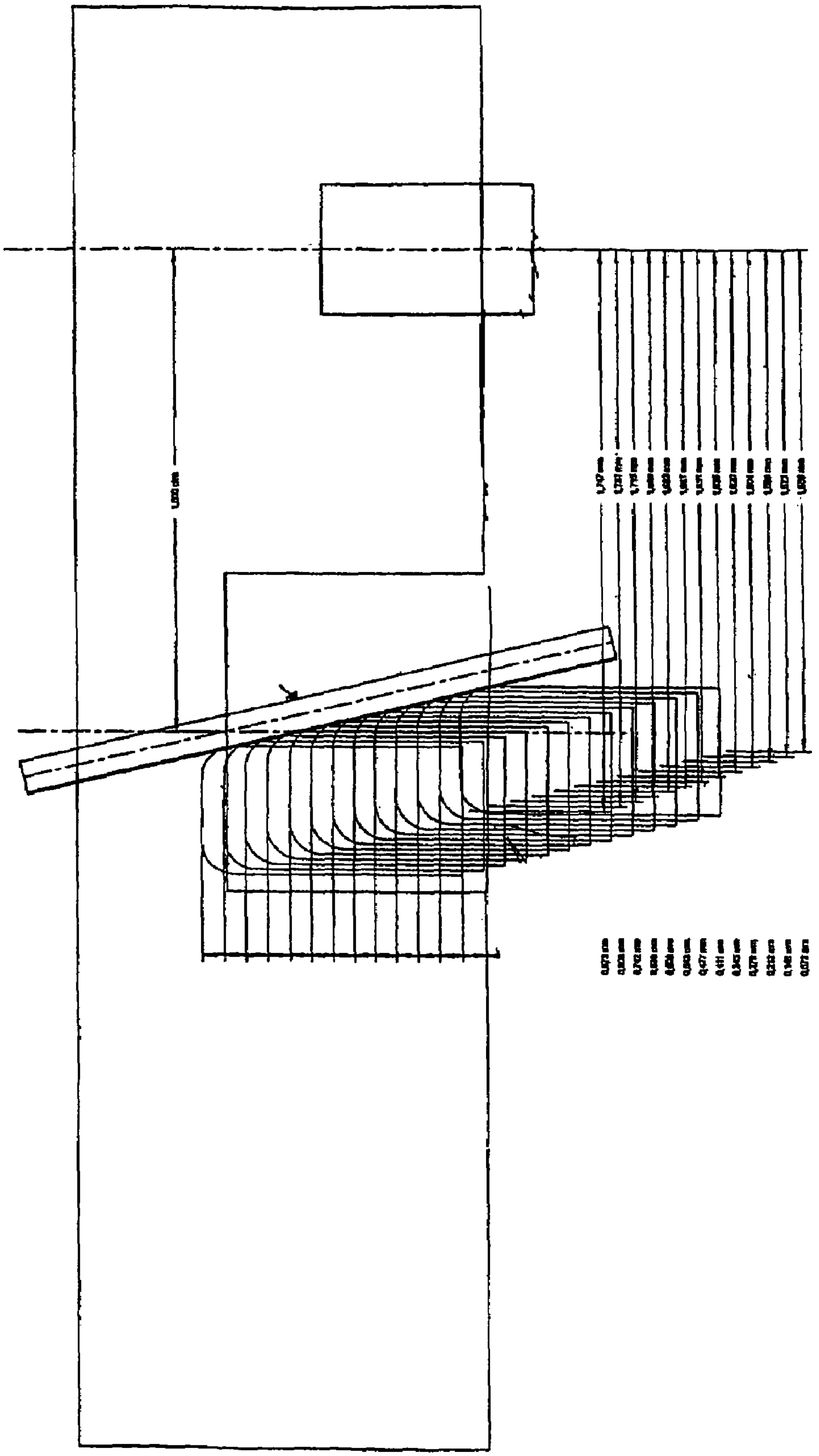
FIG. 4 illustrates schematically the sub-steps of FIGS. 2*a*-2*d*.

FIG. 4 shows another schematic illustration of the sub-steps of FIGS. 3*a*-3*d*. The FIG. 4 also comprises exemplary values of both the lateral movement as well as the vertical movement of the cutting tool used. The lateral movement could for example be a few micrometers, e.g. in the range of 1-1000 μm, preferably 5-50 μm. The vertical movement could for example be a few micrometers, e.g. in the range of 1-1000 μm, preferably 10-100 μm. The smoothness of a surface can be expressed in $R_a$, which is the arithmetic average of the deviation of the surface from an average length within a certain reference length. $R_a$ is measured in μm (micrometer) and the lower the value, the smoother the surface is. It is understood that the sub-steps of FIGS. 2*a*-2*d* are performed in a similar way.

In the figures a single aperture 5 is shown, it is however understood that the number of apertures in a grid is substantially larger, there could for example be up to several hundred, thousand of apertures in the sheet 2. The width of the X-ray transparent part 5 can be given any dimension between 1-10 000 μm, preferably 10-1000 μm.

Further, a collimator can be formed having several slits, for example arranged in a matrix arrangement, wherein each slit have a desired slope. The slits can have different slopes, that is, the collimator can have slits of varying slopes enabling the customizing of the collimator to any desired application. For example, the collimator can be adapted for use in an X-ray apparatus as described in published US patent application with publication number US-2005-0152491, assigned to the same applicant.

Figure 5:
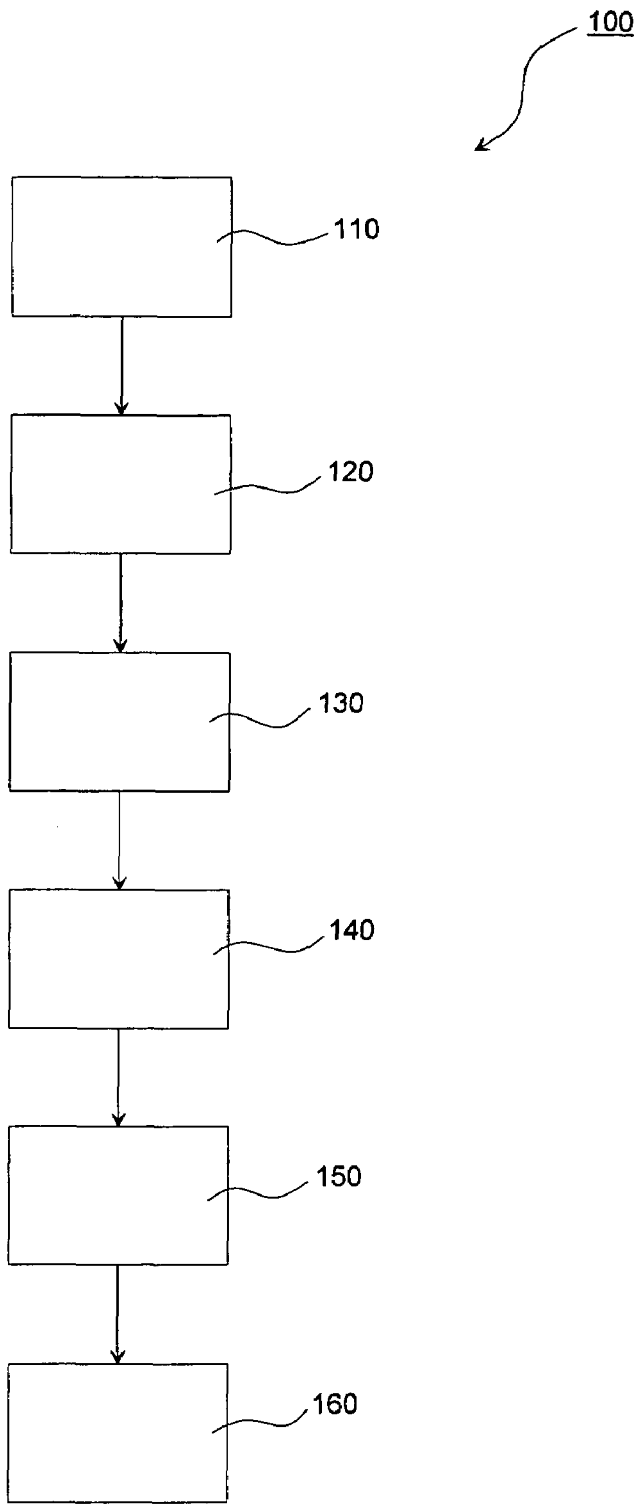
FIG. 5 is a flow chart over the steps of the inventive method of making a collimator.

With reference now to FIG. 5 the steps of the inventive method of making a collimator is summarised in a flow chart 100. In step 110 a substrate 2 is provided with a first slit 3. Next, the slit 2 is filled (step 120) with a suitable X-ray absorbing material 4. Thereafter part of the X-ray absorbing material 4 is removed (step 130) and a new slit 5 is formed. The new slit 5 is now filled (step 140) with an X-ray transparent material 6, after which part of the X-ray transparent material 6 is removed (step 150) thereby forming yet another slit 7. Finally, in step 160, the slit 7 is filled with X-ray absorbing material 8 and the formation of an aperture for passing substantially parallel radiation is completed.

A multi-step process for forming apertures in a substrate is thereby provided, and in particular a method for producing a collimator comprising such apertures. By means of the invention, no lamination is needed, thus eliminating the precision errors related to the alignment of different layers. Further, by means of the invention, the collimator can be made in an efficient and cost-effective way, yielding a light weighing and inexpensive collimator. The invention provides an innovative method of making a collimator, enabling the provision of any desired aspect ratio.

The invention claimed is:

1. A method for producing a collimator comprising an X-ray transparent substrate, wherein the method comprises the steps of:
- forming a first slit to a desired depth in said substrate, said first slit having first and second side walls;
- filling said first slit with an X-ray absorbing material, said absorbing material extending from said first side wall to said second side wall of said first slit;
- removing part of said X-ray absorbing material thereby forming a second slit extending from the remaining absorbing material to said second side wall;
- filling the second slit with X-ray transparent material;
- removing part of said X-ray transparent material thereby forming a third slit extending from the remaining transparent material to said second side wall; and
- filling said third slit with X-ray absorbing material.

2. The method as claimed in claim 1, wherein said step of removing part of said X-ray absorbing material comprises the sub-steps of:
- removing in depth a part of the X-ray absorbing material by means of a cutting tool,
- moving the cutting tool laterally, and
- removing in depth another part of the X-ray absorbing material by means of the cutting tool.

3. The method as claimed in claim 2, wherein said sub-steps are repeated until said desired slit depth is obtained.

4. The method as claimed in claim 2, wherein in said sub-step of moving the cutting tool laterally, the lateral movement of the cutting tool is in the range of 1-10 000 μm, preferably 10-500 μm.

5. The method as claimed in claim 2, wherein the depth of each in depth removed part of said X-ray absorbing material is in the range of 1-10 000 μm, preferably 10-500 μm.

6. The method as claimed in claim 1, wherein said sub-step of removing part of said X-ray transparent material comprises the sub-steps of:
- removing in depth a part of the X-ray transparent material by means of a cutting tool,
- moving the cutting tool laterally, and
- removing in depth another part of the X-ray transparent material by means of the cutting tool.

7. The method as claimed in claim 6, wherein said sub-steps are repeated until the desired slit depth is obtained.

8. The method as claimed in claim 6, wherein in said sub-step of moving the cutting tool laterally, the lateral movement of the cutting tool is in the range of 1-500 μm.

9. The method as claimed in claim 6, wherein the depth of each in depth removed part of the X-ray transparent material is in the range of 1-1000 μm.

10. The method as claimed in claim 1, wherein said formed second and third slits have a slanted surface, whereby an angled slit is formed.

11. The method as claimed in claim 1, wherein said X-ray transparent material comprises carbon, plastic, glue or any other material or mixture of materials with low atomic number.

12. The method as claimed in claim 1, wherein said X-ray absorbing material comprises wolfram, lead, gold, copper or any other material or mixture of materials with high atomic number.

13. The method as claimed in claim 1, wherein said X-ray absorbing material comprises a mixture of an absorbing material of high atomic number, such as gold, lead, tungsten or copper mixed with a binding material such as glue or plastic.

14. The method as claimed in claim 1, wherein said X-ray transparent part (5) has a width in the range of 10-500 μm.

15. The method as claimed in claim 1, wherein the desired depth is in the range of 1-1000 μm.

16. The method as claimed in claim 1, wherein said steps are repeated forming a collimator having several slits.

17. The method as claimed in claim 15, wherein said several slits have different angles.

* * * * *